United States Patent [19]
Fischer

[11] 3,968,721
[45] *July 13, 1976

[54] EXPANSION ANCHOR WITH SAFETY FEATURE

[76] Inventor: Artur Fischer, Altheimer Strasse 219, D-7241 Tumlingen, Germany

[ * ] Notice: The portion of the term of this patent subsequent to Sept. 24, 1991, has been disclaimed.

[22] Filed: June 27, 1975

[21] Appl. No.: 591,063

Related U.S. Application Data

[63] Continuation of Ser. No. 446,922, Feb. 28, 1974, which is a continuation-in-part of Ser. No. 280,885, Aug. 15, 1972, Pat. No. 3,837,257.

[30] Foreign Application Priority Data

| Aug. 17, 1971 | Germany | 2141079 |
| Sept. 14, 1971 | Germany | 2145918 |
| Dec. 15, 1971 | Germany | 2162255 |
| Dec. 24, 1971 | Germany | 2164587 |

[52] U.S. Cl............................... 85/64; 85/62; 85/72
[51] Int. Cl.² .................................... E04B 1/41
[58] Field of Search ............ 85/72, 64, 77, 78, 62; 61/45 B; 285/2

[56] References Cited

UNITED STATES PATENTS

| 768,283 | 8/1904 | Jenkins | 85/64 |
| 1,530,679 | 3/1925 | Lambert | 285/2 |
| 1,628,253 | 5/1927 | Lyddane | 85/67 |
| 2,195,029 | 3/1940 | Hathorn | 85/72 |
| 2,372,222 | 3/1945 | Mullgardt | 85/72 |
| 3,148,578 | 9/1964 | Gapp | 85/77 |
| 3,302,509 | 2/1967 | Modrey | 85/64 |
| 3,837,257 | 9/1974 | Fischer | 85/64 |

FOREIGN PATENTS OR APPLICATIONS

| 572,366 | 3/1959 | Canada | 85/77 |

Primary Examiner—Roy D. Frazier
Assistant Examiner—Rodney H. Bonck
Attorney, Agent, or Firm—Michael J. Striker

[57] ABSTRACT

An expansion anchor for use in concrete structures includes an anchor sleeve in form of a wire block spring which is to be inserted into an expansion anchor hole. A conically tapering expander member is located at the leading end of this spring, and a bolt extends from the trailing end of the spring to the leading end and is engaged with the expander member which it draws into the spring thereby expanding the latter into engagement with the material surrounding the expansion anchor hole. An abutment is provided on the expander member which engages the leading end of the spring when the expander member has been drawn into the latter, and which shears off when the pull exerted by the bolt exceeds a certain limit, in order to thereby prevent the possibility that the surrounding material of the structure in which the expansion anchor is mounted might become damaged.

5 Claims, 1 Drawing Figure

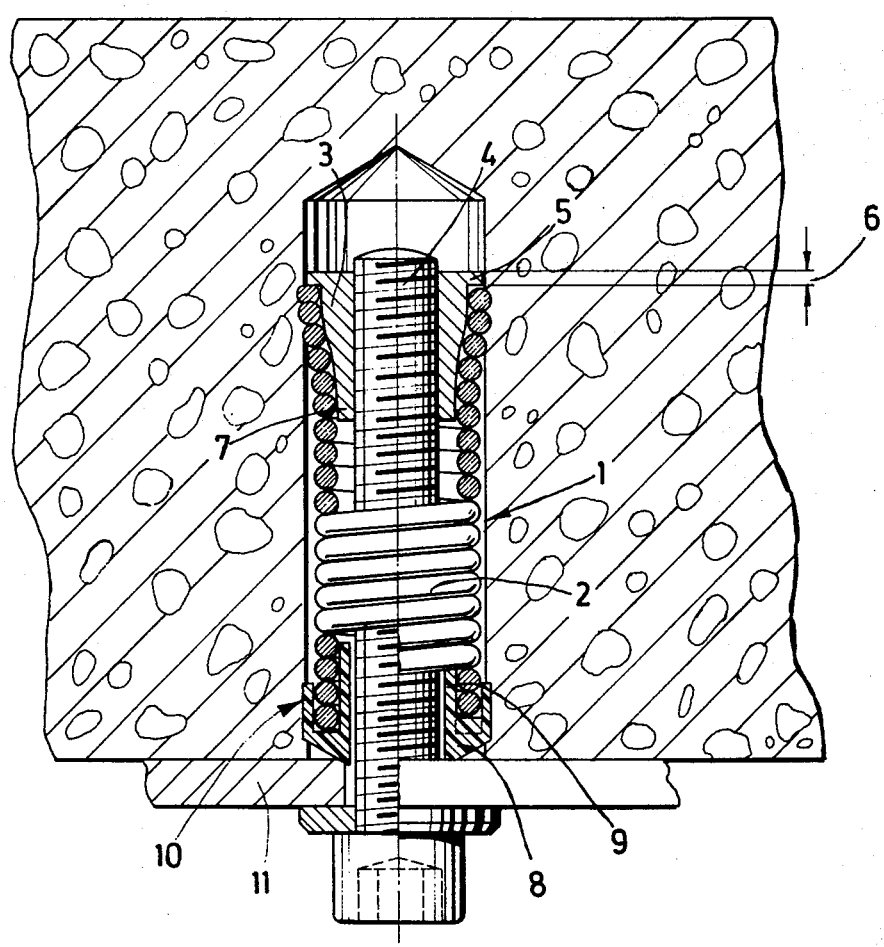

EXPANSION ANCHOR WITH SAFETY FEATURE

CROSS-REFERENCE TO RELATED APPLICATION

The present application is a continuation application of prior application Ser. No. 446,922, the latter application being a continuation-inpart of my application Ser. No. 280,885, filed Aug. 15, 1972, now issued as U.S. Pat. No. 3,837,257.

BACKGROUND OF THE INVENTION

The present invention is concerned with an expansion anchor, and more particularly with an expansion anchor which is especially suitable for use in concrete structures.

From my aforementioned U.S. Pat. No. 3,837,257, it is known to provide an expansion anchor that is particularly suitable for use in concrete structures and which utilizes an expansion anchor sleeve in form of a wire spring which is inserted into an expansion anchor hole in the respective structure, and into the leading end of which an expander member of generally conical configuration is drawn by a screw or bolt which is inserted through the sleeve from the trailing end thereof and engages the expander member. The advantage of this construction is that when the sleeve is being expanded, the developing expansion forces will act essentially in radial direction and will anchor the device in the surrounding concrete structure with the least possible damage to the concrete itself. It is well known that concrete when subjected to high localized pressures tends to break away, and by the use of the wire-spring anchor sleeve I have eliminated the kerf action which is the result of such localized pressures in prior-art constructions and which leads to the breaking-away of the concrete.

However, although my prior expansion anchor eliminates the difficulties which are heretofore attendent upon the expansion of an expansion anchor in concrete, it does not overcome a second problem which develops when external forces act upon the expander member, for instance via the expander bolt, in a sense tending to draw it further into the sleeve towards the outer end of the expansion anchor hole, beyond the degree of insertion which the expander member had already reached during the initial expansion of the sleeve. If this takes place, an abutment provided on the expander member prevents it from being fully drawn into the sleeve, and ultimately through the same and out of the sleeve; however, the engagement of the abutment with the sleeve, and the consequent further expansion of the same results in the development of very high localized forces which act via the expanding convolutions of the sleeve upon the surrounding concrete. When this takes place, in the region of the inner end of the expansion anchor hole, it will in all likelihood not cause sufficient construction of the surrounding concrete to loosen the expansion anchor. However, should the anchor slip outwardly, or should the inner end of the sleeve with the expander member for some reason be located closer to the outer end of the expansion anchor hole, then the danger of breaking away of the concrete becomes the greater, the closer the inner end of the sleeve and the expander member are located to the outer end of the expansion anchor hole. Once the concrete breaks away the expansion anchor will, of course, be freely extractable from the hole.

SUMMARY OF THE INVENTION

Accordingly, it is an object of the present invention to overcome this problem of the prior art.

More particularly, it is an object of the present invention to provide an improved expansion anchor of the type here under discussion, which is not possessed of this disadvantage.

Still more particularly, it is an object of the present invention to provide such an expansion anchor in which the breaking-away of the concrete will be reliably avoided under all circumstances.

In keeping with the above objects, and with others which will become apparent hereafter, one feature of the invention resides in an expansion anchor, particularly for use in concrete structures, which comprises an expansion anchor sleeve in form of a wire spring adapted for insertion into an expansion anchor hole and having a leading end and a trailing end. An expander member is located at the leading end and adapted to enter into the expansion anchor sleeve in direction towards the trailing end of the same. Actuating means extends through the expansion anchor sleeve from the trailing end to the expander member and is connected with the same, being operative for drawing the expander member into the expansion anchor sleeve. Abutment means is provided on the expander member and adapted to abut the leading end of the expansion anchor sleeve. The abutment means is adapted to shear off from the expander member when the force with which the latter is drawn into the expansion anchor sleeve exceeds a predetermined value.

The level of force at which the abutment means will shear off is of course so selected that the shearing-off takes place before the force could become sufficiently large to cause breaking away of the concrete surrounding the expension anchor hole. It is well known that when such breaking away occurs under the circumstances outlined above, the concrete will be destroyed in an essentially conical shape, that is when the expansion anchor is withdrawn under simultaneous breaking-away of the concrete, a conical hole will form in the concrete structure the base of the cone being located at the outer surface of the structure. This would make the expansion anchor hole unuseable.

By providing the shear-off abutment means according to the present invention, this disadvantage is avoided because, once the abutment means is sheared-off, no further increase in the expansion of the sleeve can take place, and hence no increase in the force acting upon the surrounding concrete will occur. It is then of course possible that if the force acting upon the expander member continues, the expander member may be pulled all the way through the expansion anchor sleeve. However, the expansion effect of the expander member upon the expansion anchor sleeve will remain unchanged until the expander member is completely withdrawn from the expansion anchor sleeve, thus assuring that the expansion anchor will continue to supply reliable service in the event that the extraction force should be removed. If, however, the expander member is indeed withdrawn from the expansion anchor sleeve, then the expansion anchor would have to be replaced by another one, but at least the concrete structure will not be damaged and the expansion anchor hole will still be available for insertion of a new expansion anchor, which would not be the case if the concrete surrounding the hole had been destroyed.

Moreover, because the breaking-away of the concrete and the consequent sudden termination of the holding capability of the associated expansion anchor is avoided by the present invention, a further problem is overcome that has heretofore presented difficulties in the art, namely the sudden transference of the load which is no longer being supported by the inoperative expansion anchor, to one or more additional expansion anchors which may be used to support one and the same element. Quite often a series of such expansion anchors is used to support a single element and, when one of the expansion anchors gradually looses its holding ability, the others can still retain the element with sufficient reliability. If, however, one of the expansion anchors looses its holding ability very suddenly, and the load is suddenly shifted to the others, this may cause the others to break out too.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE illustrates in a fragmentary section an embodiment of the invention.

DESCRIPTION OF THE PREFERRED EMBODIMENTS

Reference numeral 1 in the drawing identifies the expansion anchor in toto, and it will be seen that the anchor sleeve is in form of a wire spring, and more particularly a block spring 2. The block spring 2 is located in an expansion anchor hole that is formed in the concrete structure that has been illustrated in part, and located at its leading end, that is at the end of the block spring 2 which is first inserted into the expansion anchor hole, is an expander member 3 which is of generally conical configuration. An expander screw or bolt 4 is inserted from the outer end of the expansion anchor hole through the sleeve 2 and into mesh with screw threads formed in a central passage of the expander member 3. When the bolt 4 is turned in a requisite sense, the expander member 3, whose substantially cylindrical end portion 7 is first located outwardly adjacent to or only slightly within the leading end of the block spring 2, is drawn progressively farther into the block spring 2 until it reaches the position shown in the drawing in which an abutment flange 5 at the rear end of the expander member 3 engages the end convolution of the leading end of the spring 2. During this drawing-in of the expander member 3, the convolutions of the spring 2 in the region of its leading end are radially expanded and pressed against the wall surrounding the expansion anchor hole.

The abutment flange 5, which could also be of a construction other than circumferentially complete, has an outer diameter corresponding substantially to the inner diameter of the expansion anchor hole. Its thickness 6 in axial direction of the member 3 is so selected that when a force is transmitted to the member 3 via the member 4 in a sense tending to pull the member 3 farther into the block spring 2, and if such force exceeds the maximum force permissible before the concrete will begin to break away, the abutment 5 will shear off.

At the outer end of the expansion anchor hole, there is provided a cap 8 one portion of which extends into the interior of the block spring 2 and the outer portion of which has a flange 10 which surrounds one or more of the terminal convolutions of the block spring 2 at the outer end of the latter. The cap 8 is advantageously of an elastically yieldable material, such as synthetic plastic, and it becomes wedged in the hole in the object 11 which is to be anchored to the concrete structure, and prevents turning of the sleeve when the screw or bolt 4 is tightened. The portion 7 serves to center the member 3 in the sleeve 2, it has an outer diameter corresponding to the inner diameter of the sleeve 2 in unexpanded condition.

Among the advantages of the construction according to the present invention is the fact that since no danger of breaking-out of the concrete exists, expansion anchor holes for adjacent expansion anchors can be located more closely together in a concrete structure than was heretofore possible. The distance at which they must be kept apart now is only governed by the distance through which stress is transmitted to the surrounding concrete by the expanded block spring 2; however, this distance is substantially smaller than the distance over which the concrete would be affected if breaking-out in an outwardly conical pattern were to occur. Evidently, the more expansion anchor holes (and therefore expansion anchors) can be provided per unit surface area of a concrete structure, the greater the load that can be supported.

Instead of the cirumferentially complete flange constituting the abutment means in the illustrated embodiment, individual projections or other abutments could also be utilized as long as they meet the requirement that they must shear off when the maximum permissible force is exceeded beyond which the material of the concrete structure would tend to break away.

This force, incidentally, can be readily determined empyrically, since different types of concrete will break away at different force levels. This means that it is merely necessary to test the different types of concrete mixtures to obtain for each type of concrete a force level to which the shearing-off of the abutment can be readily accommodated. Evidently, if the resistance of the material of the expander member 3 to shearing off is known, the force at which it will shear off can be readily preselected by selecting an appropriate thickness for the abutment means 5. Of course, this can also be influenced by, for instance, providing the abutment means 5 with weakened zones, but these are all calculations which are readily within the skill of those conversant with this art.

It will be understood that each of the elements described above, or two or more together, may also find a useful application in other types of constructions differing from the types described above.

While the invention has been illustrated and described as embodied in an expansion anchor having a safety feature, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An anchoring arrangement, comprising a supporting structure formed of a low-strength material having a known breaking strength when a predetermined pressure is exerted thereto, said supporting structure having wall portions bounding an anchor hole; an expansion anchor sleeve in form of a wire spring received in said anchor hole of said supporting structure and having a leading end and a trailing end; an expander member at said leading end and adapted to enter into said expansion anchor sleeve in direction towards said trailing end; actuating means extending through said expansion anchor sleeve from said trailing end to said expander member and being connected with the same, said actuating means being operative for drawing said expander member into said expansion anchor sleeve and for thereby pressing said expansion anchor sleeve outwardly against said wall portions; and break-away means on said expander member in abutment with said leading end of said expansion anchor sleeve for limiting axial movement of the latter so long as the pressure exerted by said expansion anchor sleeve against said wall portions bounding said anchor hole is below said predetermined pressure required for breaking said low-strength material of said supporting structure, and for breaking off from said expander member when said predetermined pressure is exceeded, said break-away means comprising a break-away flange having an axial thickness so selected that said flange will shear off from said expander member before the force exerted by said expansion anchor sleeve against said wall portions bounding said anchor hole can reach said predetermined pressure.

2. An expansion anchor as defined in claim 1, wherein said wire spring is a block spring.

3. An expansion anchor as defined in claim 1, wherein said expander member has a free end facing away from said trailing end of said sleeve, and converges in direction towards said trailing end.

4. An expansion anchor, as defined in claim 3, wherein said break-away means is provided in the region of said free end.

5. An expansion anchor as defined in claim 4, wherein said flange extends from said expander member in the region of said free end.

* * * * *